Patented Feb. 24, 1948

2,436,491

UNITED STATES PATENT OFFICE 2,436,491

METHOD OF PRODUCING A CYCLO-OLEFIN

Louis Schmerling, Riverside, Ill., assignor to Universal Oil Products Company, Chicago, Ill., a corporation of Delaware No Drawing. Application April 27, 1944, Serial No. 533,055

4 Claims. (Cl. 260—666)

1

This invention relates to a combination process for the preparation of unsaturated compounds. More specifically the process is concerned with the condensation of a saturated hydrocarbon with an unsaturated halide to produce a halogenated saturated hydrocarbon followed by dehydrohalogenation of the halogenated hydrocarbon to yield an unsaturated compound.

An object of the invention is to prepare an olefinic hydrocarbon by reacting an isoparaffinic hydrocarbon with a halo-olefin in the presence of a metal halide catalyst of the Friedel-Crafts type to form a haloparaffin with subsequent dehydrohalogenation of the haloparaffin.

Another object of the invention is the production of an olefinic hydrocarbon by reacting a naphthenic hydrocarbon with a halo-olefin in the presence of a metal halide catalyst to form a halonaphthene followed by dehydrohalogenation of the halonaphthene.

A further object of my invention comprises the production of a higher molecular weight unsaturated halide by reacting a paraffinic or naphthenic hydrocarbon with a halo-olefin in the presence of a metal halide catalyst to form a dihalide followed by partial dehydrohalogenation of the dihalide.

In one embodiment the present invention is directed to a process for producing an olefinic hydrocarbon which comprises condensing a saturated hydrocarbon and a mono-halo-olefin in the presence of a catalyst of the Friedel-Crafts type to form a monohalogenated saturated hydrocarbon which is subjected to dehydrohalogenation to yield the desired olefin.

In another embodiment this invention relates to a process for preparing a higher molecular weight unsaturated halide which comprises reacting a saturated hydrocarbon and a halo-olefin in the presence of a metal halide catalyst to form a dihalide and subjecting said dihalide to partial dehydrohalogenation.

For the first step of the process of my invention the saturated hydrocarbons which may be employed include naphthenic and isoparaffinic hydrocarbons. Isobutane is the isoparaffin preferably subjected to reaction with a halo-olefin such as a chloro-olefin, bromo-olefin, etc., although higher molecular weight isoparaffins also react with such unsaturated halides to produce higher boiling alkyl halides. However, as the higher molecular weight isoparaffins, such as isopentane, isohexane, etc., are themselves valuable constituents of gasoline, they are consequently used less commonly than isobutane as charging

2 stocks for conversion into higher molecular weight alkyl halides. Hydrocarbon mixtures containing substantial proportions of isoparaffins and normal paraffins are also utilizable in the process of this invention.

The naphthenic hydrocarbons which are suitable for use include saturated monocyclohydrocarbons having the general formula $C_n-H_{2n}$, as well as bicyclic and polycyclic saturated compounds. The monocyclic compounds are often referred to as cycloparaffins and alkyl cycloparaffins and are also known as cycloalkanes and alkyl cycloalkanes. The cycloparaffins preferably used in my process are those having 5 and 6 carbon atoms in the ring. The lower cycloparaffins having 3 and 4 carbon atoms in the ring may also be condensed with a halo-olefin although these cycloparaffins are not to be considered on an equivalent basis with the naphthenic hydrocarbons of higher molecular weight.

Naphthenic hydrocarbons are available in various gasoline and naphtha fractions or they may be obtained as reaction products from certain hydrocarbon conversion reactions, for example, the catalytic cyclization of aliphatic hydrocarbons followed by hydrogenation of the resulting aromatic hydrocarbons to naphthenic hydrocarbons. Naphthenic hydrocarbons which are particularly interesting as starting materials for the present process includue cyclohexane, methylcyclopentane, methylcyclohexane and other alkyl or poly alkylcyclohexanes. In general, naphthenic hydrocarbons which contain tertiary carbon atoms are preferred.

Halo-olefins which may be reacted with the saturated hydrocarbons according to the process of the present invention contain at least one halogen atom per molecule and comprise haloethenes, -propenes, -butenes, -pentenes and halo-alkenes of higher molecular weight. Vinyl chloride, allyl chloride, methallyl chloride and the corresponding bromine compounds are representative of suitable halo-olefins. The term "halo-olefins" is also used herein to refer to other unsaturated compounds of carbon, hydrogen, and halogen containing more than one halogen atom and more than one double bond per molecule, such as 1,2-dichloroethylene, 1,2-dichloropropene-2, etc. Halo-olefins may be formed in any suitable manner, such as by the action of a halogen upon an olefinic hydrocarbon at a temperature at which substitution occurs and substantially in excess of that at which addition of halogen to the olefinic double bond is the principal reaction. Monohalo-olefins may also be prepared by the removal of one molecule of hydrogen halide from a di-haloalkane by any of several well known methods.

Catalysts of the Friedel-Crafts type which may be used in effecting the interaction of a halo-olefin with a saturated hydrocarbon of the type herein described include metal chlorides and bromides and particularly the chlorides of aluminum and zirconium. Of these catalytic materials, aluminum chloride is generally more widely applicable in that it possesses substantial catalytic activity at relatively low temperatures. The metal halides of the Friedel-Crafts type are preferably employed at temperatures between about —30° and about +25° C., although higher temperatures, generally not in excess of about 100° C. are also sometimes utilizable with certain reaction mixtures.

Metal halide catalysts of the Friedel-Crafts type may be employed as such, as mixtures or supported by carriers such as alumina, diatomaceous earth, clay, pumice, activated charcoal, etc. Materials so utilizable as carriers should have substantially no harmful effect on the catalyst activity of the metal halide or mixture of metal halides employed. In some instances the catalyst may be dissolved in a suitable solvent such as a nitroparaffin.

The condensation of isobutane with allyl chloride, for example, yields a chloroheptane, 1-chloro-3,4-dimethylpentane, as the principal product. A by-product of the reaction is a dichloroheptane, 1,2-dichloro-4,4-dimethylpentane. According to the process of the present invention the chloroheptane is dehydrohalogenated to heptene and the dichloride to either a chloroheptene or a heptine, depending upon the extent to which dehydrohalogenation was carried out. Similarly, the principal product of the reaction of isobutane with vinyl chloride is 1,1-dichloro-3,3-dimethylbutane which is readily converted to a chlorohexene and somewhat less readily to a hexine. In analogous manner, the trichlorohexane obtained by the reaction of isobutane with 1,2-dichloro-ethylene may be dehydrochlorinated to dichlorohexene or less highly halogenated products.

The condensation of the saturated hydrocarbon with a halo-olefin, unsaturated halide or alkenyl halide of the type of vinyl-, allyl-, methyl chloride or -bromide, etc., is carried out using either batch or continuous type operation. In order to obtain high yields of the halogenated hydrocarbon, a molar excess of saturated hydrocarbon to halo-olefin should be present throughout the entire reaction. Generally not more than about 20 molecular proportions of saturated hydrocarbon per molecular proportion of halo-olefin are present in the reaction mixture charged to the process. Thus, in a batch type operation a halo-olefin is added gradually to a reactor containing a saturated hydrocarbon and a Friedel-Crafts type catalyst. The reaction temperature is maintained below about 100° C. and preferably between about —30 and about +25° C., while sufficient pressure is maintained to keep a substantial proportion of the reactants in liquid state. The reaction mixture is agitated by stirring, shaking or other suitable means to effect intimate contact of the reactants and catalyst. During this treatment the saturated hydrocarbon combines chemically with the halo-olefin to produce a halogenated hydrocarbon the number of carbon atoms in which is equal to the sum of the carbon atoms present in one molecule each of the reacting hydrocarbon and halo-olefin.

After such a batch type operation, the normally liquid products are separated from the catalyst and the latter is returned to further use in the condensation reaction zone. Hydrogen halide present in the reaction products may be returned to the process or utilized for some other purpose as desired. In some cases, it is desirable to commingle hydrogen with the reaction mixture since it has a tendency to increase the active life of the catalyst.

Continuous condensation of the saturated hydrocarbon with a halo-olefin is carried out by introducing the halo-olefin, also referred to as an unsaturated halide, or a mixture of a saturated hydrocarbon and said halide to a circulating commingled mixture of a saturated hydrocarbon and a metal halide catalyst, particularly aluminum chloride or another compound of the Friedel-Crafts type. The mixture of saturated hydrocarbon, halo-olefin, catalyst, and sometimes hydrogen or a hydrogen halide is directed through a mixer or through a reactor containing packing material to effect intimate contact of the catalyst with the reacting hydrocarbons. The conditions of temperature and pressure employed in such a condensation treatment are within the limits indicated above, but specific conditions used in any given condensation reaction vary with the molecular weights and reactivity of the reactants, the concentration and activity of the catalyst employed, and other factors.

Following removal from the condensation reaction zone, the halohydrocarbon is introduced to a second reaction zone wherein it is subjected to dehydrohalogenation to yield the desired olefin. The dehydrohalogenation may be effected in the presence of various alkaline reaction agents, including alkali metal hydroxides, alkaline earth metal oxides, such as lime and magnesia and the common commercial reagent known as soda lime. The temperature employed will depend upon the particular reagent utilized for the reaction. With granular soda lime good yields are obtainable at temperatures from about 200 to about 450° C.

Another method of dehydrohalogenation consists in heating the halide with water or aqueous solutions of acids, or acid-acting salts at temperatures from about 150 to about 275° C. and usually under relatively high pressures. At a temperature of about 200° C., the pressure employed is usually from about 200 to about 300 pounds per square inch.

A further method of dehydrohalogenation consists in contacting the halide with silica, clays or alumina and particularly with alumina impregnated with alkaline earth metal halides at temperatures from about 200 to about 450° C.

Still another method of dehydrohalogenation consists in heating the halide with an alcohol, particularly methanol, at temperatures from about 150 to about 275° C., in the presence or absence of an alkali or acid.

The olefins produced in the second step of the process may, if desired, be hydrogenated to produce a saturated hydrocarbon. This hydrogenation may be effected at moderate temperatures of from about 20 to about 300° C., depending on the pressure and the catalyst employed. Active hydrogenation catalysts such as reduced nickel or cobalt may be used.

The following examples are given to illustrate the character of the results obtained by the use of the present process although the data presented are not introduced with the intention of unduly limiting the broad scope of the invention.

*Example I*

94 grams of allyl chloride was added during two and one-half hours to a mixture of 380 grams of isobutane and 15 grams of aluminum chloride. The temperature was maintained at the reflux temperature of the isobutane, that is, around −10° C., and the reactants were constantly mixed by a motor-driven stirrer. The reaction product was separated from the catalyst, washed, dried and distilled. There was obtained 56 grams of 1-chloro-3,4-dimethylpentane and 31 grams of 1,2-dichloro-4,4-dimethylpentane. The 1-chloro-3,4-dimethylpentane had a boiling point of 151° C. This chloroheptane was then subjected to dehydrohalogenation by passing it over an alumina catalyst at a temperature of 315° C. The product obtained comprised a heptene mixture boiling at 80 to 92° C. and corresponding to 92% of the theoretical yield based on the hydrocarbon charged. Hydrogenation of the heptene yielded heptane consisting principally of 2,3-dimethylpentane.

*Example II*

20 grams of the dichloroheptane obtained in the condensation reaction set forth in Example I was heated with 40 grams of methanol at 230° C. There was obtained 6 grams of chloroheptene boiling at 135 to 145° C.

*Example III*

A hexane fraction, tertiary butylchloride and a dichlorohexane (1,1-dichloro-3,3-dimethylbutane) boiling at 142 to 148° C. were the chief products formed by reacting isobutane with vinyl chloride in the presence of aluminum chloride at −10° C. When 40 grams of the dichlorohexane was passed over alumina at 300° C. there was obtained an 85% yield of chlorohexene boiling at 100 to 105° C. and having a refractive index, $n_D^{20}$, of 1.4265 and a density, $d_4^{20}$, of 0.8696. When a solution of the dichloride and ethanol was passed over alumina at 400° C. the reaction proceeded in the same manner, except that ethyl chloride was obtained as a by-product instead of hydrogen chloride. Small amounts of hexine were also formed in the course of the reaction.

I claim as my invention:

1. A process which comprises reacting a naphthenic hydrocarbon with a halo-olefin in the presence of a halide catalyst of the Friedel-Crafts type and subjecting the resultant halonaphthene to dehydrohalogenation to yield an unsaturated compound.

2. A process which comprises reacting a cycloparaffinic hydrocarbon having six carbon atoms in the ring with a halo-olefin in the presence of a halide catalyst of the Friedel-Crafts type and subjecting the resultant halocycloalkane to dehydrohalogenation to form an unsaturated compound.

3. The process of claim 1 further characterized in that said naphthenic hydrocarbon contains a tertiary carbon atom.

4. The process of claim 1 further characterized in that said catalyst comprises aluminum chloride.

LOUIS SCHMERLING.

REFERENCES CITED

The following references are of record in the file of this patent:

UNITED STATES PATENTS

| Number | Name | Date |
| --- | --- | --- |
| 1,975,456 | Hass et al. | Oct. 2, 1934 |
| 2,136,270 | Bennett | Nov. 8, 1938 |
| 2,141,611 | Malisher | Dec. 27, 1939 |
| 2,174,246 | Lieber et al. | Sept. 26, 1939 |
| 2,246,762 | Schirm | June 24, 1941 |
| 2,288,580 | Baehr | June 30, 1942 |
| 2,314,335 | Frey | Mar. 23, 1943 |
| 2,322,258 | Strosacker et al. | June 22, 1943 |
| 2,353,766 | Schmerling | July 18, 1944 |
| 2,368,446 | Buc | Jan. 30, 1945 |

OTHER REFERENCES

Thomas, "Anhydrous Aluminum Chloride in Organic Chemistry," pages 734, 737–744 (1941). (Copy in Division 31.)

Nenitzescu, "Ber. der Deut. Chem. Gesell.," vol. 66, pages 1100–1103 (1933). (Copy in Patent Office Scientific Library.)